(No Model.)
C. E. WAGNER.
WAGON FENDER.
No. 387,702. Patented Aug. 14, 1888.
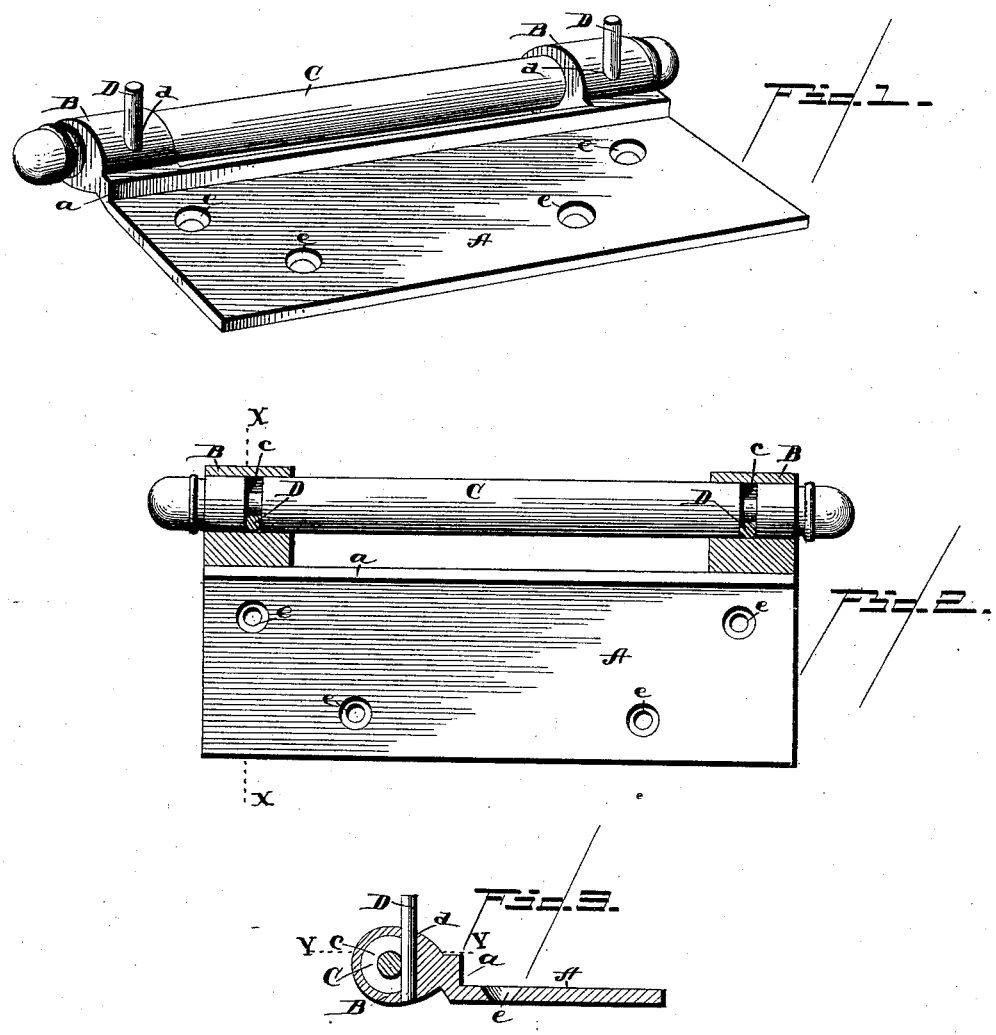
WITNESSES.
M. H. Pumphrey.
Van Buren Hillyard.
INVENTOR,
Charles E. Wagner
By R. S. & A. P. Lacey,
Attorney.
N. PETERS, Photo-Lithographer, Washington, D. C.

UNITED STATES PATENT OFFICE.

CHARLES E. WAGNER, OF HOLMESBURG, PENNSYLVANIA.

WAGON-FENDER.

SPECIFICATION forming part of Letters Patent No. 387,702, dated August 14, 1888.

Application filed May 16, 1888. Serial No. 274,063. (No model.)

*To all whom it may concern:*

Be it known that I, CHARLES E. WAGNER, a citizen of the United States, residing at Holmesburg, in the county of Philadelphia and State of Pennsylvania, have invented certain new and useful Improvements in Wagon-Fenders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to fenders for vehicles, and has for its object the provision of a device to prevent the front wheels of a vehicle from cutting into the sides of the vehicle-body, which will be simple, compact, efficient, and capable of being readily applied.

The improvement consists of a plate having bearings at each end and transverse grooves through the bearings, and a roller fitted in the bearings and held therein by pins passing through said transverse grooves and fitting in annular grooves in the said roller, which hereinafter will be more fully described and claimed and shown in the annexed drawings, in which—

Figure 1 is a perspective view of the fender; Fig. 2, a cross section on the line X X of Fig. 3; and Fig. 3, a horizontal section on the line Y Y of Fig. 2, showing the roller in full.

The plate A is provided at one edge with the flange $a$, which extends at right angles to the plate, and with the lugs B at each end, which are longitudinally bored to receive the roller C and form bearings therefor.

The roller C is of tempered steel and of uniform diameter from end to end, and is provided with annular grooves $c$ at each end. The bearing-lugs B have transverse openings $d$, which are arranged to come opposite the grooves $c$ in the roller, and the pins D, passing through the openings $d$ and fitting in the grooves $c$, hold the roller in position against longitudinal movement, but do not prevent the free rotary movement of the said roller in its bearings. The projecting ends of the roller are finished to add to the appearance of the fender.

The plate A is designed to fit against the bottom of the vehicle, and is held thereto by bolts or screws passing through the openings $e$, and the flange $a$ rests against the side of the body and forms a stay to receive the strain. The roller can be readily removed by knocking out the pins D and sliding it out endwise, and is adjusted by an endwise movement, being held in position by the pins D, as aforesaid.

Having thus described my invention, what I claim, and desire to secure by Letters Patent, is—

1. The combination, with the plate having bearing-lugs, and having transverse openings through the lugs, of the roller journaled in the lugs and having annular grooves opposite the said openings, and the pins passing through the openings in the lugs and fitting in the grooves in the roller, substantially as described, for the purpose specified.

2. The herein-described fender, composed of the plate having bolt-openings, and having one edge provided with a flange, and with bearing-lugs at each end, the lugs having transverse openings, the roller of uniform diameter from end to end journaled in the lugs, and having annular grooves opposite the said openings, and the pins passing through the said openings and fitting in the grooves, substantially as and for the purpose set forth.

In testimony whereof I affix my signature in presence of two witnesses.

CHARLES E. WAGNER.

Witnesses:
  WM. LOVELESS,
  WM. WARD.